United States Patent [19]

Eisenberg et al.

[11] 4,393,021

[45] Jul. 12, 1983

[54] METHOD FOR THE MANUFACTURE OF GRANULAR GRIT FOR USE AS ABRASIVES

[75] Inventors: Gustav Eisenberg, Hanover; Günter Bigorajski, Gehrden, both of Fed. Rep. of Germany

[73] Assignee: Vereinigte Schmirgel und Maschinen-Fabriken AG, Hannover-Hainholz, Fed. Rep. of Germany

[21] Appl. No.: 271,983

[22] Filed: Jun. 9, 1981

[51] Int. Cl.³ .............................................. B02C 4/14
[52] U.S. Cl. .................................. 264/143; 264/118; 264/119; 264/140; 264/141; 264/142
[58] Field of Search ............... 264/117, 118, 119, 140, 264/141, 142, 143

[56] References Cited

U.S. PATENT DOCUMENTS

| | | | |
|---|---|---|---|
| 2,194,472 | 3/1940 | Jackson | 51/298 |
| 3,414,640 | 12/1968 | Garetto et al. | 264/140 |
| 3,670,467 | 6/1972 | Walker | 264/143 |
| 3,859,407 | 1/1975 | Blanding et al. | 264/140 |
| 4,148,627 | 4/1979 | Haley | 264/140 |
| 4,219,521 | 8/1980 | Baumann | 264/141 |
| 4,279,579 | 7/1981 | Froeschke | 264/142 |

FOREIGN PATENT DOCUMENTS

| | | |
|---|---|---|
| 2447520 | 4/1975 | Fed. Rep. of Germany . |
| 2608273 | 9/1977 | Fed. Rep. of Germany . |

*Primary Examiner*—Donald E. Czaja
*Assistant Examiner*—W. Thompson
*Attorney, Agent, or Firm*—Mason, Mason & Albright

[57] ABSTRACT

A pasty mix of granular grits, binder and filler is pressed through a sieve web by rolling action to form cylindrical, worm-like extrusions. After hardening in a heating duct the extrusions are subjected to the same action and thereby granular grit particles are formed each of which contains several grits.

The apparatus for carrying out the method includes a sieve web which co-operates with a rotor having several freely rotatable rollers around its periphery.

6 Claims, 3 Drawing Figures

METHOD FOR THE MANUFACTURE OF GRANULAR GRIT FOR USE AS ABRASIVES

BACKGROUND OF THE INVENTION

1. Field of the Invention

This invention relates to a method of manufacture of grinding grit granulate. Such granulates may be of corundum and/or zirconium corundum or silicon carbide bound together with a synthetic resin binding medium, preferably phenol-formaldehyde resin, with the addition of fillers with grinding action, for example cryolite and/or inert constituents, for example, chalk.

2. Summary of the Prior Art

It has been proposed in U.S. Pat. No. 2,194,472 (George H. Jackson—issued Mar. 26, 1940) to manufacture a flexible grinding or abrasive medium. The carrier or backing for the abrasive agglomerate is sprinkled with such grinding grit agglomerates each agglomerate being formed by a plurality of individual grits bonded together. During the actual manufacture of the described aggregate particles, the individual components, such as grinding grit, binding medium and filler are mixed, hardened into a compact mass, subsequently crushed and the resultant crushed pieces sieved to select the desired agglomerate size for further processing.

Apart from the substantial dust generation during such crushing and sieving, the yield of useful agglomerate following the sprinkling on a carrier of the selected individual particle sizes it is uneconomically small.

According to tests, with this manufacturing method, the useful agglomerate particles amount in the final yield to an amount below 25% of the quantity initially used.

Furthermore, in German Auslegeschrift No. 2,608,273 a sheet or strip-shaped flexible grinding tool is described, on the base of which conical grinding bodies are secured, which consist of a plurality of grinding grits, which are bound together by a binding medium together with a filler. The manufacture of conical grinding bodies from a plurality of grinding grits, binding medium and fillers is characterized in German Auslegeschrift No. 2,608,273 in that the grinding grits and fluid matrix binding medium is dispersed in an organic solvent medium phase, preferably perchloro-ethylene and is held therein is suspension, until the conical grinding bodies form, which on hardening of the matrix binding medium stabilise in their conical shape.

Apart from the fact that this method relates to the formation of synthetic resin bound conical-shaped bodies described in German Offenlegungsschrift No. 2,447,520, the manufacture of the grinding bodies prepared with cone size values which can be employed individually for sprinkling involves substantial difficulties in the technical use of the necessary quantity, so that this method has not hitherto been brought into practical use. In this respect substantial disadvantages of the method arise, in particular the environment is affected by the organic solvent medium vapours, especially during the preparation of the substantially porous grinding bodies, from which the organic solvent material must be evaporated.

It has also been proposed that grinding grit agglomerates can be obtained with the exclusion of the above-mentioned disadvantages, if a pasty, water-moistened mixture of grinding grits and binding media, preferably water-soluble phenol-formaldehyde resin is pressed with the aid of a steel blade or other scraper through a sieve web or a perforated sheet with predetermined mesh or hole width, and after drying and hardening in a heating duct the cylindrical, effectively extruded, agglomerate particles are again pressed through the sieve to form the required granular grit particles.

Such cylindrical, extruded, granulate is formed by steel blades or scrapers driven over flexible sieve webs, with the steel blades scraping over the sieve mounted around the periphery of a cylindrical rotor and extending parallel to the rotational axis. The sieve web is applied around the under part of the rotor in a semi-cicle and is tensioned so that the grinding grit mixture to be granulated can be introduced from above. The driven bladed rotor touches, during rotation, the blades on the sieve web and presses the grinding grit mixture moistened with the binding materials through the sieve web, from which the continuous cylindrical, worm like, extruded granulate falls, which can be dried and hardened in an adjacent through-flow heating duct.

This mechanical arrangement has however the disadvantage that both the hard steel blades of the rotor and also the sieve web of metal or synthetic resin filaments wear relatively rapidly as a result of the abrasive action of the grit mixture. During the dry granulation carried out with the same device for breaking and sieving it was similarly observed that high wear was caused by the dried, cylindrical, granulate particles. Furthermore it was desirable, to increase the granulate yield from about 150 kilograms per hour to the large quantities required for full scale technical manufacture and furthermore to produce, as far as possible, uniform particle size.

An object of the present invention is to provide a method and apparatus which advantageously provides for the large-scale manufacture of agglomerate, grinding grit containing particles of uniform size, without the disadvantages of smaller yields and giving rise to environmental disadvantages by release of dust or solvent medium vapours.

SUMMARY OF THE INVENTION

According to the present invention there is provided a method of producing granular grit particles each including several individual grits comprises the steps of mixing the grits with a binding medium, and a filler to form a pasty mass, pressing the mass through a mesh by relative rolling motion to form extruded lengths of the mass, heating the extended lengths to harden them, and pressing the hardened lengths through a mesh by relative rolling action to form the said required granular grit particles.

Further, according to the present invention there is provided in apparatus for producing granular grit particles each including several individual grits, means for mixing the grits with a binding medium and a filler to form a pasty mass, a continuous sieve web, a rotor having a plurality of rollers rotatably mounted around its periphery and in co-operating relationship with the sieve web, means for supplying the pasty mass to the sieve web at the zone of co-operating relationship with the rotor whereby to press the mass through the web to form extruded lengths of the mass, heating means for hardening said extruded lengths, and means for returning the hardened lenghts to the rotor and sieve web after the extrusion has been completed whereby to break up the hardened lengths into said granular grit particles each including several individual grits.

DESCRIPTION OF THE PREFERRED EMBODIMENT

Figure 1:
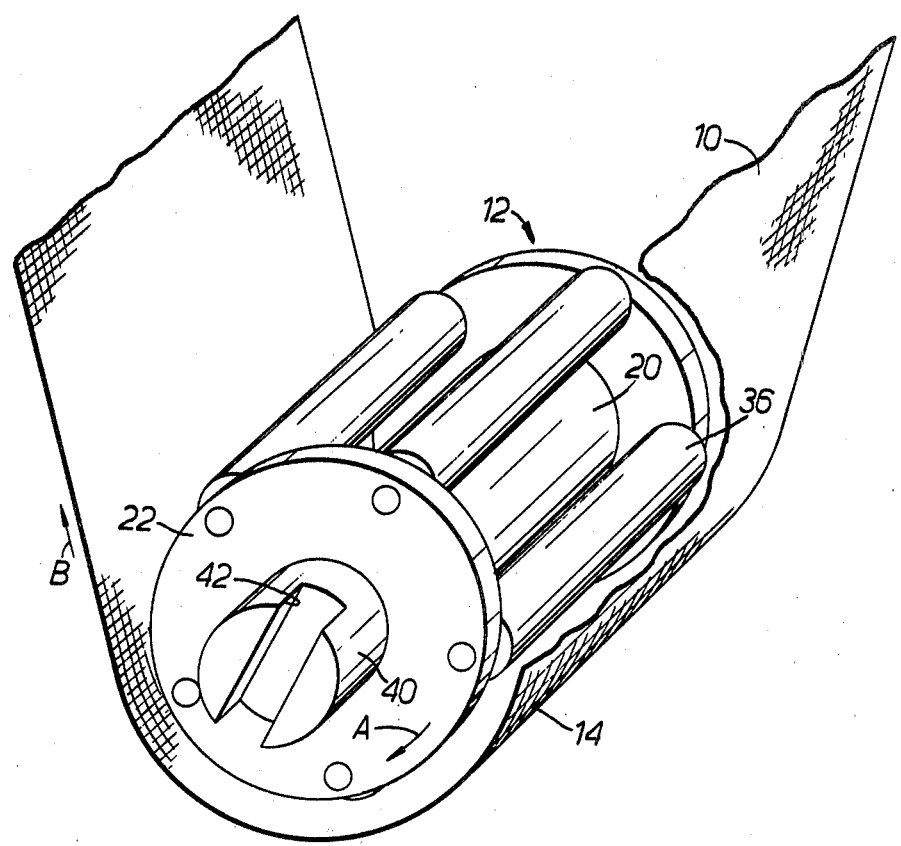
FIG. 1 is a perspective view of granulate producing apparatus in accordance with the invention.
Figure 2:
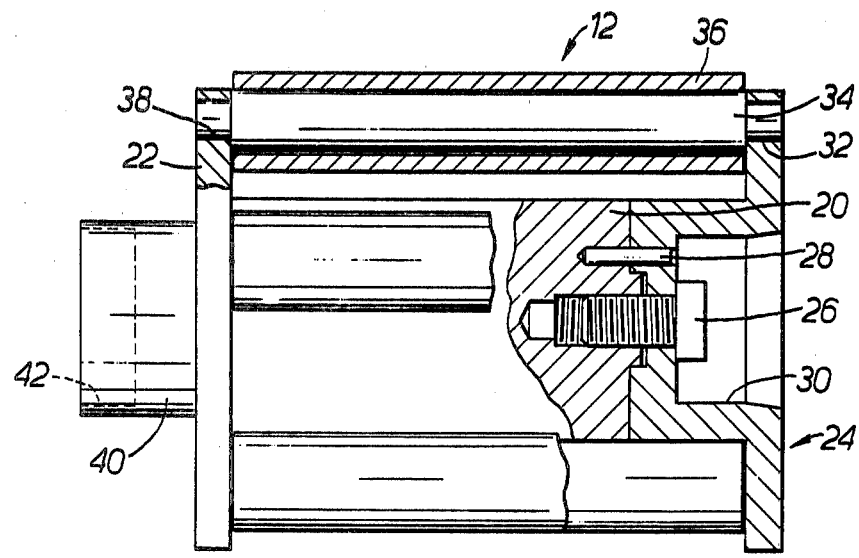
FIG. 2 is a longitudinal side elevation, partly in section of the rotor of the apparatus of FIG. 1.
Figure 3:
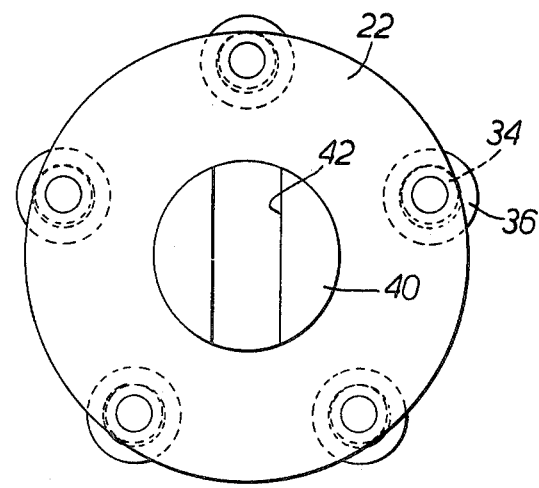
FIG. 3 is an end elevation of the rotor of FIG. 2.

The apparatus includes an endless sieve web 10, guided by rollers, not shown, and a rotor 12 arranged at least substantially in contact with a lower portion 14 of the web which effectively wraps around the lower half of the rotor. The sieve web will have mesh openings appropriate to the size of the final desired agglomerate particles. Drive means (not shown) for the sieve web will also be provided.

The rotor 12 comprises a core 20 with an integral end plate 22 at one end and a readily detachable end plate 24 secured by a set screw 26 and located by a pin 28. The end plate 24 is provided with a central recess 30 and apertures 32 each for receiving a reduced diameter end portion of one of a plurality of freely-rotatable spindles 34. Each spindle 34 carries a freely-rotatable sleeve or tube 36. The end of each spindle 34 remote from the end plate 24 is rotatably supported in an aperture 38 of the integral end plate 22. The core 20 has an extension 40 beyond the end plate 22 and this has a rectangular recess 42 to enable engagement by a drive key (not shown).

In operation, assuming motion as indicated by arrows A and B, a pasty mixture of grit, binder and filler is fed into the nip between the rotor and the sieve web and the tubes or sleeves 36 of the rotor 12 press the mixture through the mesh holes thus forming cylindrical, worm-like, extrusions. The cross-section of the extrusions will, of course, be dependent upon the mesh holes. As will be appreciated no relative scraping motion occurs between the rotor and the sieve web.

The extruded agglomerate is then hardened in a heating duct and returned to the illustrated or a separate but similar apparatus where it is broken up by interaction between the rotor 12 and the sieve web 10. Agglomerate particles of certain sizes pass through the sieve web while coarser particles accumulate at the zone where the upwardly-moving sieve web leaves its contact path with the rotor. When the amount of over-size particles exceeds a certain amount, the infeed of fresh coarse agglomerate can be stopped and the sieve web drive reversed so that the accumulation of rejected particles can be broken down. This process can be reversed several times until the rejected coarser particles are all acceptable.

By means of the hereinbefore described apparatus the movement of the previously used steel scraper blades encouraging wear is converted into a rolling motion over the sieve web, corresponding to the rotational speed of the same rotor. This rolling rotor makes possible a drastic reduction of the wear and a three or four fold increase of the yield. This constructional form renders the method suitable for large-scale technical manufacture of grinding grit granulate over the whole ambit of requirements, so that with this technical advance in the manufacture of grinding grit granulate particles the grinding means for these granulates can for the first time be used in large-scale technical practice.

The yield of particle sizes utilisable directly for scattering on to a backing or carrier amounts to 85 to 95%. Moreover, it is readily possible, by change of the mesh size of the preferred sieve web used to vary the overall size of the granulate according to requirements.

The reduction of the wear with this dry granulating process by means of a rolling rotor and therefore becomes far more important than granulation of moist grinding grit containing mixtures.

By means of the method and apparatus hereinbefore described and in particular the formation of the blades of the rotor, not only was the wear of the blades and the sieve web drastically reduced, but also the yield per unit time was increased by from 3 to 4 times, that is to 500 to 600 kilograms of granulate per hour.

We claim:

1. A method of producing granular grit particles each including several individual grits comprises the steps of
    mixing the grits with a binding medium, and a filler to form a pasty mass,
    pressing the mass through a mesh by relative rolling motion to form extruded lengths of the mass,
    heating the extruded lengths to harden them, and
    pressing the hardened lengths through a mesh by relative rolling action to form the said required granular grit particles.

2. A method according to claim 1, wherein the same apparatus is used for both said pressing steps.

3. A method according to claim 1, wherein the said extruded lengths are dried and hardened in a through-flow drying furnace.

4. A method according to claim 1, wherein phenolurea resin is used as binding medium.

5. A method according to claim 1, wherein a melamineformaldehyde resin is used as binding medium.

6. A method according to claim 1, wherein an alkyd unsaturated polyester resin is used as binding medium.

* * * * *